(12) United States Patent  
Sugita (10) Patent No.: US 10,818,956 B2  
(45) Date of Patent: Oct. 27, 2020

(54) INSPECTION APPARATUS AND INSPECTION METHOD

(71) Applicant: TOYOTA JIDOSHA KABUSHIKI KAISHA, Toyota-shi, Aichi-ken (JP)

(72) Inventor: Kazumi Sugita, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 114 days.

(21) Appl. No.: 15/830,273

(22) Filed: Dec. 4, 2017

(65) Prior Publication Data

US 2018/0166732 A1 Jun. 14, 2018

(30) Foreign Application Priority Data

Dec. 8, 2016 (JP) ................................. 2016-238518

(51) Int. Cl.
| | |
|---|---|
| *H01M 8/2483* | (2016.01) |
| *H01M 8/04537* | (2016.01) |
| *H01M 8/04746* | (2016.01) |
| *H01M 8/04664* | (2016.01) |
| *H01M 8/0202* | (2016.01) |
| *H01M 8/1018* | (2016.01) |

(52) U.S. Cl.
CPC ....... *H01M 8/2483* (2016.02); *H01M 8/0202* (2013.01); *H01M 8/04619* (2013.01); *H01M 8/04664* (2013.01); *H01M 8/04761* (2013.01); *H01M 2008/1095* (2013.01)

(58) Field of Classification Search
None
See application file for complete search history.

(56) References Cited

U.S. PATENT DOCUMENTS

| | | |
|---|---|---|
| 6,338,472 B1 | 1/2002 | Shimazu et al. |
| 2013/0202976 A1 | 8/2013 | Chikugo et al. |

FOREIGN PATENT DOCUMENTS

| | | |
|---|---|---|
| CN | 101228656 A | 7/2008 |
| CN | 103026541 A | 4/2013 |
| JP | 2000-317358 | 11/2000 |
| JP | 2006-48984 | 2/2006 |
| JP | 2006-139943 | 6/2006 |
| JP | 2010-10073 | 1/2010 |
| JP | 2014-7006 | 1/2014 |
| JP | 2014-229578 | 12/2014 |
| WO | WO2007/010372 A2 | 1/2007 |

*Primary Examiner* — Tracy M Dove
(74) *Attorney, Agent, or Firm* — Finnegan, Henderson, Farabow, Garrett & Dunner, LLP

(57) ABSTRACT

Provided is an inspection apparatus that has a plurality of electrically conductive intermediate plates and is used to inspect the power generation performance of unit cells of a fuel cell each disposed between the intermediate plates. The inspection apparatus has an oxidation gas supply manifold formed as through-holes provided in the unit cells and through-holes provided in the intermediate plates communicate with one another, and through which an oxidation gas is supplied into the unit cells. In a stacking direction of the intermediate plates and the unit cells, the oxidation gas is supplied from one end that is open. The oxidation gas supply manifold has water drain holes that extend downward and are respectively formed on an outer side of the unit cells located at both ends in the stacking direction, and the water drain holes are coupled to each other on a lower side of the water drain holes.

5 Claims, 7 Drawing Sheets

INSPECTION APPARATUS AND INSPECTION METHOD

INCORPORATION BY REFERENCE

The disclosure of Japanese Patent Application No, 2016-238518 filed on Dec. 8, 2016 including the specification, drawings and abstract is incorporated herein by reference in its entirety.

BACKGROUND

1. Technical Field

The present disclosure relates to an inspection apparatus and an inspection method, and more particularly to cells of a fuel cell.

2. Description of Related Art

An inspection apparatus that simultaneously inspects the performance of a plurality of cells of a fuel cell is known (Japanese Unexamined Patent Application Publication No. 2014-229578 (JP 2014-229578 A)). For purposes such as increasing the work efficiency of replacing cells to be inspected, the inspection apparatus described in JP 2014-229578 A is provided with a plurality of intermediate plates. During inspection, cells to be inspected are each inserted between the intermediate plates. Thus, the intermediate plates and the cells are stacked. Then, an oxidation gas is supplied to each cell through a supply manifold that extends through the stacked intermediate plates and cells, and the oxidation gas from each cell is discharged through a discharge manifold that extends through the stacked intermediate plates and cells.

SUMMARY

Water such as water produced during power generation (hereinafter referred to as product water), humidifying water, etc. collects inside the manifold. The amount of water collecting is not uniform throughout the inside of the manifold but varies according to the position. For this reason, the power generation performance differs among the cells according to the position of the cell in the inspection apparatus.

The present disclosure provides an inspection apparatus and an inspection method that can reduce the difference in the power generation performance among cells based on the position of the cell in the inspection apparatus.

One aspect of the present disclosure is an inspection apparatus that has a plurality of electrically conductive intermediate plates and is used to inspect the power generation performance of unit cells of a fuel cell each disposed between the intermediate plates. The inspection apparatus has a supply manifold which is formed as first through-holes provided in the unit cells and second through-holes provided in the intermediate plates communicate with one another, and through which an oxidation gas is supplied into the unit cells. In a stacking direction of the intermediate plates and the unit cells, one end of the supply manifold is open while another end is closed, and the oxidation gas is supplied from the one end that is open. The supply manifold has water drain holes that extend downward and are respectively formed on an outer side of the unit cells located at both ends in the stacking direction. The water drain holes are coupled to each other on the lower side of the water drain holes.

According to this inspection apparatus, the water drain holes coupled to each other are provided at both ends of the unit cells, which makes it possible to form a water film with reduced variation in the water level inside the supply manifold across all the unit cells. In other words, the difference in the amount of water collecting based on the position inside the supply manifold can be reduced. It is therefore possible to reduce the difference in the power generation performance among the unit cells based on the position of the cell in the inspection apparatus.

In the above aspect, the water drain holes may be provided not only on the outer side of the unit cells located at both ends in the stacking direction but also on an inner side of the unit cells located at both ends in the stacking direction, and the water drain holes may be respectively formed inside the plurality of intermediate plates. Thus, the variation in the water level is further reduced. It is therefore possible to further reduce the difference in the power generation performance among the unit cells based on the position of the cell in the inspection apparatus.

In the above aspect, the inspection apparatus may further include an end plate that is disposed on the outer side, in the stacking direction, of a group of the intermediate plates disposed in an array, and at least one of the water drain holes may be formed inside the end plate. Thus, the water drain hole can be provided more easily than if the water drain hole is formed inside another component of the inspection apparatus.

In the above aspect, a lateral hole that extends the supply manifold in the stacking direction may be formed in the intermediate plate located at the other end that is closed. Thus, a difference between the shape of the manifold around the cell located farthest on the deep side of the supply manifold and the shape of the manifold around the other unit cells can be reduced. It is therefore possible to further reduce the variation in the water level, and to further reduce the difference in the power generation performance among the unit cells based on the position of the cell in the inspection apparatus.

In the above aspect, the inspection apparatus may further have a discharge manifold which is formed as third through-holes provided in the unit cells and fourth through-holes provided in the intermediate plates communicate with one another, and through which the oxidation gas is discharged from inside the unit cells; an open end of an oxidation gas flow passage provided in the unit cell that opens toward the discharge manifold may be located on the lower side in an inner periphery of the third through-hole; and the discharge manifold may have a water drain hole that is formed in the fourth through-hole and extends downward. Thus, water discharged from the unit cells into the discharge manifold is discharged through the water drain hole. Accordingly, the water once discharged from the unit cells into the discharge manifold is prevented from returning into the unit cells. It is therefore possible to reduce the difference in the power generation performance among the unit cells based on the amount of water returning into the cell.

In the above aspect, a plurality of the third through-holes may be provided in one unit cell, and one fourth through-hole that is large enough to contain all the third through-holes may be formed in one intermediate plate. Accordingly, masses of water respectively generated from portions around the plurality of third through-holes are discharged as one puddle through the water drain hole. Thus, it is possible to evenly discharge the masses of water respectively generated from the portions around the plurality of third through-holes.

In the above aspect, the intermediate plate may include a tank in which water flowing out of the fourth through-hole is collected. Thus, the water having flowed out is discharged into the tank. It is therefore possible to continuously discharge the water from the discharge manifold by a simple configuration.

Another aspect of the present disclosure is an inspection method using an inspection apparatus that has a plurality of electrically conductive intermediate plates and is used to inspect the power generation performance of unit cells of a fuel cell each disposed between the intermediates plates. The inspection apparatus has a supply manifold which is formed as first through-holes provided in the unit cells and second through-holes provided in the intermediate plates communicate with one another, and through which an oxidation gas is supplied into the unit cells. In a stacking direction of the intermediate plates and the unit cells, one end of the supply manifold is open while another end is closed, and the oxidation gas is supplied from the one end that is open. The supply manifold has water drain holes that extend downward and are respectively formed on the outer side of the unit cells located at both ends in the stacking direction. The water drain holes are coupled to each other on the lower side of the water drain holes. The inspection method includes: making the unit cells generate electric power; and inspecting the power generation performance of the unit cells after waiting until a water film has been formed across all the unit cells to be inspected, on the lower side in an inner periphery of the supply manifold. According to this inspection method, the power generation performance of unit cells is inspected after a water film with reduced variation in the water level, has been formed inside the supply manifold across all the unit cells. Thus, inspection can be performed in a state where the difference in the amount of water collecting based on the position inside the supply manifold is reduced. It is therefore possible to reduce the difference in the power generation performance among the unit cells based on the position of the cell in the inspection apparatus.

According to the aspects of the present disclosure, it is possible to provide an inspection apparatus and an inspection method that can reduce the difference in the power generation performance among unit cells based on the position of the cell in the inspection apparatus.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiment 1

Figure 1:
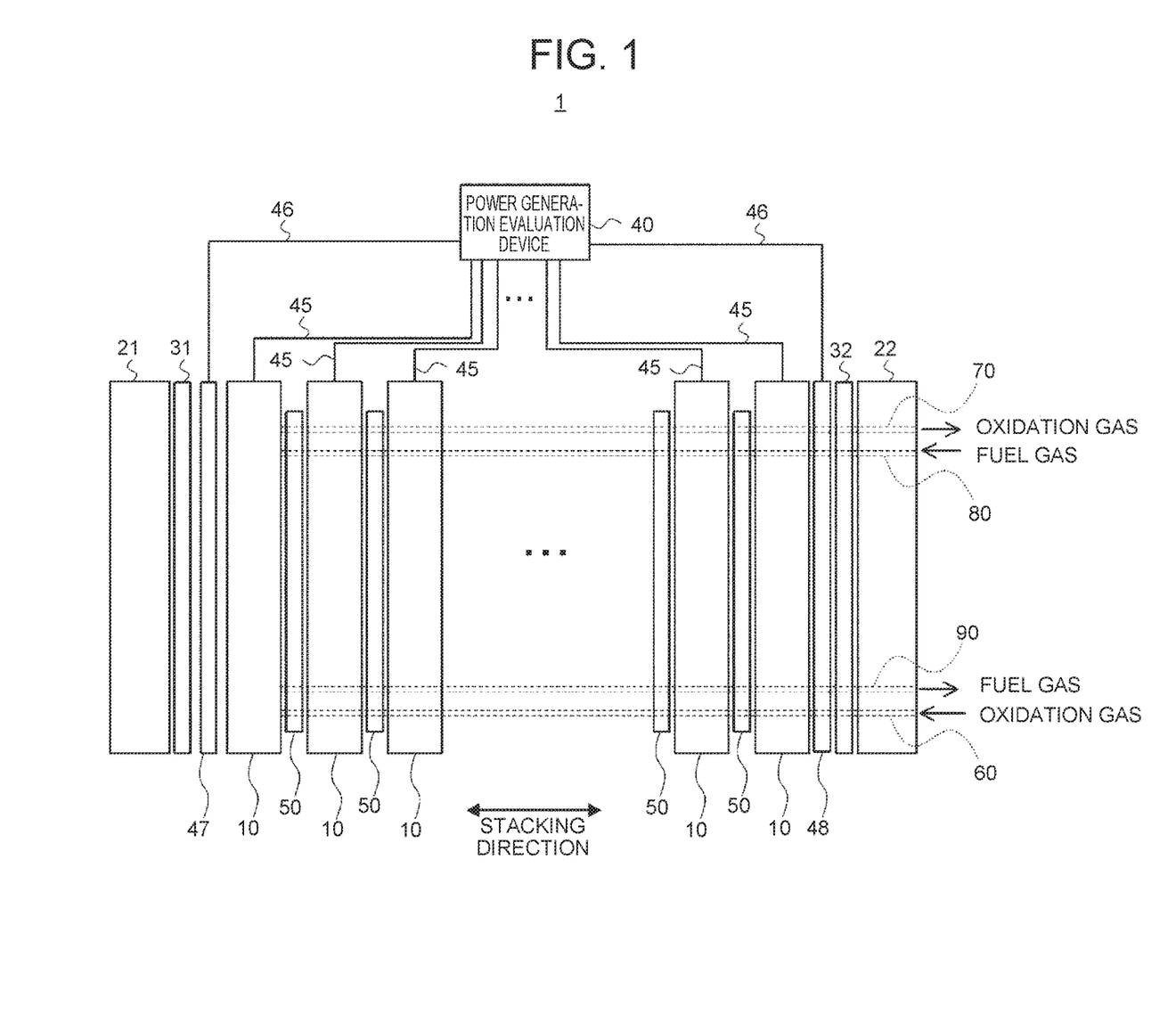
FIG. 1 is a schematic view showing the general configuration of an inspection apparatus according to an embodiment.

An embodiment of the present disclosure will be described below with reference to the drawings. FIG. 1 is a schematic view showing the general configuration of an inspection apparatus 1 according to the embodiment. FIG. 1 shows a state where cells 50 to be inspected are disposed in the inspection apparatus 1. For example, the inspection apparatus 1 is used to inspect the power generation performance of the cells 50 that are components of a fuel cell during manufacturing of the fuel cell. For example, the cell 50 is composed of a membrane electrode assembly, a gas diffusion layer, a separator plate, etc.

The inspection apparatus 1 has a plurality of intermediate plates 10, a first end plate 21, a second end plate 22, a first electric insulating plate 31, a second electric insulating plate 32, a first terminal 47, a second terminal 48, and a power generation evaluation device 40, and inspects the power generation performance of the cells 50.

The intermediate plate 10 is a rectangular, flat plate-shaped instrument, and is made of an electrically conductive member, such as metal. The intermediate plates 10 are disposed in an array with principal surfaces of adjacent intermediate plates 10 facing each other. The cells 50 of a fuel cell to be inspected are each disposed between two adjacent intermediate plates 10 during inspection. Here, as shown in FIG. 1, the inspection apparatus 1 can simultaneously inspect a plurality of cells 50 (e.g., 20 cells 50). Therefore, the plurality of intermediate plates 10 and the plurality of cells 50 are stacked in a horizontal direction in the inspection apparatus 1. Hereinafter, a direction defined by this stacking will be referred to as a stacking direction. The plurality of intermediate plates 10 and the plurality of cells 50 stacked may be collectively referred to as a stack. The stack is fastened with fastening members (not shown) while being pressed toward an inner side in the stacking direction.

The first end plate 21 and the second end plate 22 are disposed on an outer side, in the stacking direction, of a group of the intermediate plates 10 disposed in an array. Specifically, the first end plate 21 and the second end plate 22 are disposed so as to sandwich the group of the intermediate plates 10 through the first electric insulating plate 31 and the second electric insulating plate 32, respectively. In other words, the first end plate 21 is disposed on the outer side of one outermost intermediate plate 10 through the first electric insulating plate 31, while the second end plate 22 is disposed on the outer side of the other outermost intermediate plate 10 through the second electric insulating plate 32. The first end plate 21 and the second end plate 22 are coupled through the fastening members (not shown) and press the stack from both sides.

An oxidation gas supply manifold 60 through which an oxidation gas, such as air containing oxygen, is supplied is formed at lower parts of the plurality of intermediate plates 10 and the plurality of cells 50 stacked. The oxidation gas supply manifold 60 is formed as through-holes (through-holes 101 of FIG. 2 and FIG. 3) that are respectively provided in the intermediate plates 10 so as to extend therethrough in the stacking direction, and through-holes (through-holes 501 of FIG. 2 and FIG. 3) that are respectively provided in the cells 50 so as to extend therethrough in the stacking direction, communicate with one another. In this embodiment, a plurality of (e.g., three) through-holes forming the oxidation gas supply manifolds 60 are provided in a horizontal direction perpendicular to the stacking direction. Accordingly, a plurality of (e.g., three) oxidation gas supply manifolds 60 are provided. The oxidation gas supplied from an air pump etc. (not shown) to the oxidation gas supply manifolds 60 flows into oxidation gas flow passages provided in the cells 50.

An oxidation gas discharge manifold 70 through which the oxidation gas is discharged is formed at upper parts of the plurality of intermediate plates 10 and the plurality of cells 50 stacked. The oxidation gas discharge manifold 70 is formed as through-holes (through-holes 102 of FIG. 2 and FIG. 5) that are respectively provided in the intermediate plates 10 so as to extend therethrough in the stacking direction, and through-holes (through-holes 502 of FIG. 2) that are respectively provided in the cells 50 so as to extend therethrough in the stacking direction, communicate with one another. In this embodiment, a plurality of (e.g., three) through-holes forming the oxidation gas discharge manifolds 70 are provided in the horizontal direction perpendicular to the stacking direction. Accordingly, a plurality of (e.g., three) oxidation gas discharge manifolds 70 are provided. The oxidation gas flowing out of the above-mentioned oxidation gas flow passages provided in the cells 50 is discharged to the outside through the oxidation gas discharge manifolds 70. Thus, the oxidation gas supplied from a lower part of the cell 50 into the cell 50 passes through the flow passage provided in the cell 50 and escapes from an upper part of the cell 50. Parts of the inspection apparatus according to this embodiment are the same components as those described with the inspection apparatus shown in the related art of FIG. 2.

A fuel gas supply manifold 80 through which a fuel gas, such as hydrogen, is supplied is formed at upper parts of the plurality of intermediate plates 10 and the plurality of cells 50 stacked. The fuel gas supply manifold 80 is formed as through-holes that are respectively provided in the intermediate plates 10 so as to extend therethrough in the stacking direction and through-holes that are respectively provided in the cells 50 so as to extend therethrough in the stacking direction communicate with one another. The fuel gas supplied from a fuel tank (not shown) to the fuel gas supply manifold 80 flows into fuel gas flow passages provided in the cells 50.

A fuel gas discharge manifold 90 through which the fuel gas is discharged is formed at lower parts of the plurality of intermediate plates 10 and the plurality of cells 50 stacked. The fuel gas discharge manifold 90 is formed as through-holes that are respectively provided in the intermediate plates 10 so as to extend therethrough in the stacking direction and through-holes that are respectively provided in the cells 50 so as to extend therethrough in the stacking direction communicate with one another. The fuel gas flowing out of the above-mentioned fuel gas flow passages provided in the cells 50 is discharged to the outside through the fuel gas discharge manifold 90.

For example, the through-holes forming the fuel gas supply manifold 80 and the through-holes forming the fuel gas discharge manifold 90 are formed farther on an outer side in the horizontal direction than the through-holes forming the oxidation gas supply manifold 60 and the through-holes forming the oxidation gas discharge manifold 70.

The power generation evaluation device 40 is a measuring instrument that is connected to each intermediate plate 10 through a cable 45, and is connected to the first terminal 47 on the inner side of the first electric insulating plate 31 and to the second terminal 48 on the inner side of the second electric insulating plate 32 through cables 46. The power generation evaluation device 40 functions as a load device to which an electric current flows from the cells through the terminals 47, 48 at both ends and the cables 46, and executes power generation inspection of the cells 50 by acquiring the voltages of the cells 50 through the intermediate plates 10 and the cables 45.

Figure 2:
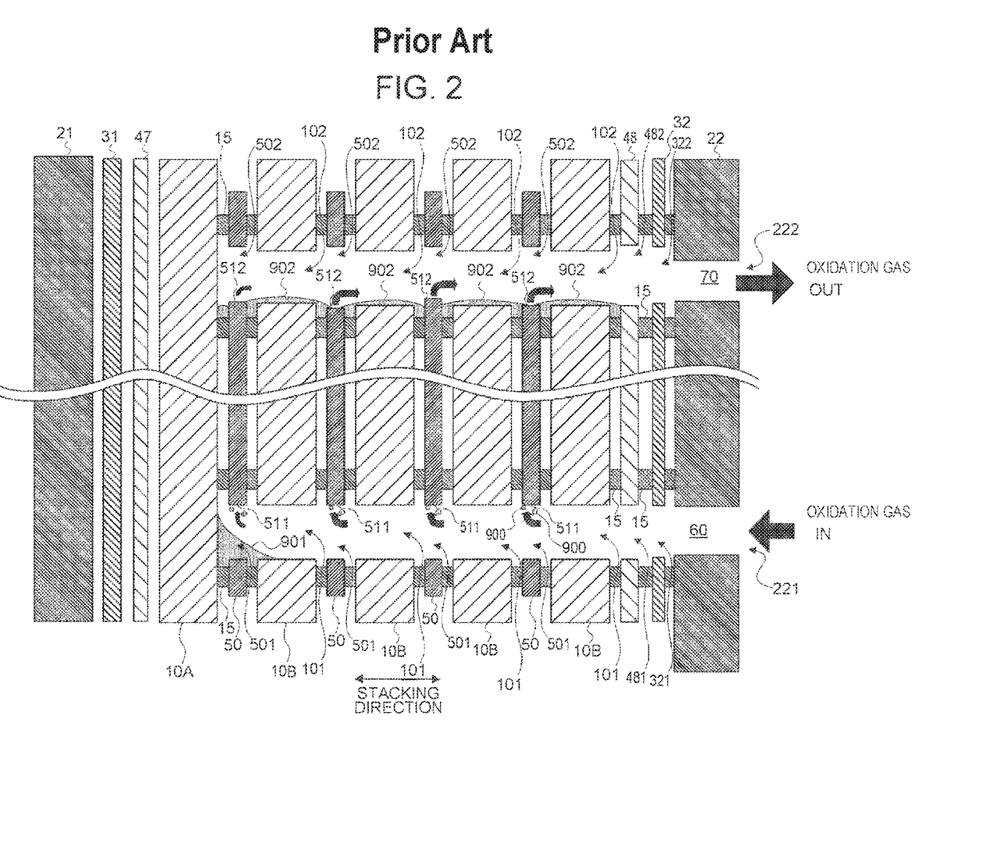
FIG. 2 is a schematic view showing the inspection apparatus with cells to be inspected each disposed between intermediate plates according to a related art.

Next, possibilities in the oxidation gas supply manifold 60 and the oxidation gas discharge manifold 70 will be described. FIG. 2 is a schematic view showing an inspection apparatus with the cells 50 to be inspected each disposed between the intermediate plates 10 according to the related art. In FIG. 2, a cross-section of the stack in the stacking direction is shown. As the oxidation gas supply manifold 60 and the oxidation gas discharge manifold 70 will be described here, the fuel gas supply manifold 80, the fuel gas discharge manifold 90, etc. are not shown in FIG. 2. Four cells 50 are shown as objects to be inspected in FIG. 2, but the number of the cells 50 is of course not limited to four. In the following description, the outermost intermediate plate 10 on the side of the first end plate 21 will be referred to as an intermediate plate 10A, and the other intermediate plates 10 will be referred to as intermediate plates 10B for distinction.

First, the oxidation gas supply manifold 60 will be described. In the inspection apparatus according to the related art of FIG. 2, too, the oxidation gas supply manifold 60 is formed as described above when the cells 50 are each disposed between the intermediate plates 10. Specifically, as shown in FIG. 2, the oxidation gas supply manifold 60 is formed as the through-holes 501 provided in the cells 50 and the through-holes 101 provided in the intermediate plates 10B communicate with one another. More specifically, a gasket 15 is provided between the cell 50 and the intermediate plate 10, and the through-hole 501 provided in the cell 50 and the through-hole 101 provided in the intermediate plate 10B communicate with each other through the gasket 15 to form the oxidation gas supply manifold 60. Through-holes communicating with the through-holes 501 and the through-holes 101 are also provided in the second terminal 48, the second electric insulating plate 32, and the second end plate 22. Specifically, a through-hole 481 is provided in the second terminal 48, a through-hole 321 is provided in the second electric insulating plate 32, and a through-hole 221 is provided in the second end plate 22. The through-hole 101, the through-hole 481, the through-hole 321, and the through-hole 221 communicate with one another through the gaskets 15. Thus, the oxidation gas can be supplied from an end of the oxidation gas supply manifold 60 on the side of the second end plate 22 to the oxidation gas supply manifold 60. In FIG. 2, reference sign 15 for the gaskets 15 is partially omitted for visibility. On the other hand, the intermediate plate 10A is not provided with the through-hole 101. Accordingly, in the stacking direction of the intermediate plates 10 and the cells 50, one end of the oxidation gas supply manifold 60 is open while the other end is closed, and the oxidation gas is supplied from the one end that is open. The through-hole 501 is located at a lower part of the oxidation gas flow passage (not shown) provided in the cell 50. The through-holes 101, 221, 481, 321 are provided at such positions that these through-holes communicate with the through-holes 501 of the cells 50 disposed in the inspection apparatus 1.

An open end 511 of the oxidation gas flow passage provided in the cell 50 is provided at an upper part in an inner periphery of the through-hole 501 of the cell 50. The open end 511 opens toward the oxidation gas supply manifold 60. Thus, when the cell 50 is disposed in the inspection apparatus 1, the open end 511 is located on an upper side in an inner periphery of the oxidation gas supply manifold 60. Accordingly, during power generation of the cell 50, water drops 900 of product water, humidifying water, etc. drop from the open end 511 into the oxidation gas supply manifold 60. In FIG. 2, reference sign 900 for the water drops 900 is partially omitted for visibility. As a result, a puddle 901 is formed inside the oxidation gas supply manifold 60.

Here, as shown in FIG. 2, the puddle 901 tends to form on the closed side of the oxidation gas supply manifold 60. This is because of the following two reasons. First, a shearing force exerted by the oxidation gas flowing into the open end 511 becomes weaker toward a deep side of the oxidation gas supply manifold 60, i.e., toward the opposite side from the open side (in other words, toward the closed side). Accordingly, a force for moving water through the oxidation gas flow passage (not shown) inside the cell 50 is weaker, and the water is more likely to drip from the open end 511, at the cell 50 located farther on the deep side. Thus, the water tends to collect on the deep side of the oxidation gas supply manifold 60. Secondly, since the oxidation gas is supplied from the open side of the oxidation gas supply manifold 60, the water is moved toward the deep side by the shearing force acting inside the oxidation gas supply manifold 60. Thus, the water tends to collect on the deep side of the oxidation gas supply manifold 60. For these reasons, the amount of water collecting inside the oxidation gas supply manifold 60 is not uniform throughout the inside of the oxidation gas supply manifold 60 but varies according to the position.

The present inventors have found that water collecting in this way causes a difference in the power generation performance among the cells 50. As water collects on the deep side of the oxidation gas supply manifold 60, the degree of humidification of the oxidation gas flowing into the open end 511 becomes higher in the cell 50 located farther on the deep side of the oxidation gas supply manifold 60, which results in a difference in the degree of humidification among the cells 50. This seems to be one factor causing the difference in the power generation performance.

The present inventors have also found a difference in the power generation performance among the cells 50 that is attributable to the oxidation gas discharge manifold 70. This will be described below. In the inspection apparatus according to the related art of FIG. 2, too, the oxidation gas discharge manifold 70 is formed as described above when the cells 50 are each disposed between the intermediate plates 10. Specifically, as shown in FIG. 2, the oxidation gas discharge manifold 70 is formed as the through-holes 502 provided in the cells 50 and the through-holes 102 provided in the intermediate plates 10B communicate with one another. More specifically, the gasket 15 is provided between the cell 50 and the intermediate plate 10, and the through-hole 502 provided in the cell 50 and the through-hole 102 provided in the intermediate plate 10B communicate with each other through the gasket 15 to form the oxidation gas discharge manifold 70. Through-holes communicating with the through-holes 502, 102 are also provided in the second terminal 48, the second electric insulating plate 32, and the second end plate 22. Specifically, a through-hole 482 is provided in the second terminal 48, a through-hole 322 is provided in the second electric insulating plate 32, and a through-hole 222 is provided in the second end plate 22. The through-hole 102, the through-hole 482, the through-hole 322, and the through-hole 222 communicate with one another through the gaskets 15. Thus, the oxidation gas discharged from the cells 50 into the oxidation gas discharge manifold 70 can be discharged from an end of the oxidation gas discharge manifold 70 on the side of the second end plate 22. On the other hand, the intermediate plate 10A is not provided with the through-hole 102. Accordingly, in the stacking direction of the intermediate plates 10 and the cells 50, one end of the oxidation gas discharge manifold 70 is open while the other end is closed, and the oxidation gas is discharged from the one end that is open. The through-hole 502 is located at an upper part of the oxidation gas flow passage (not shown) provided in the cell 50. The through-holes 102, 322, 482, 222 are provided at such positions that these through-holes communicate with the through-holes 502 of the cells 50 disposed in the inspection apparatus 1.

An open end 512 of the oxidation gas flow passage (not shown) provided in the cell 50 is provided at a lower part of an inner periphery of the through-hole 502 of the cell 50. The open end 512 opens toward the oxidation gas discharge manifold 70. Thus, when the cells 50 are disposed in the inspection apparatus 1, the open end 512 is located on a lower side in an inner periphery of the oxidation gas discharge manifold 70.

The oxidation gas flows into the flow passage (not shown) of the cell 50 from the open end 511 located on the side of the oxidation gas supply manifold 60, and is discharged into the oxidation gas discharge manifold 70 from the open end 512 located on the side of the oxidation gas discharge manifold 70. Accordingly, water such as product water and humidifying water is discharged from the open end 512 into the oxidation gas discharge manifold 70. Thus, a puddle 902 is formed around the open end 512. As the open end 512 is located on the lower side inside the oxidation gas discharge manifold 70, part of water in the puddle 902 returns into the cell 50. Here, the amount of water returning into the cell 50 is not necessarily equal among all the cells 50, partly due to the difference in the amount of water collecting around the cell 50. In other words, the amount of water returning into the flow passage inside the cell 50 varies among the cells 50. The amount of water collecting around the cell 50 differs according to differences in the position of the gasket 15, differences in the external dimensions of a separator of the cell 50, etc. As the amount of returning water varies, the amount of water retained in the flow passage inside the cell 50 differs among the cells 50. This difference in turn causes a variation among the cells 50 in the pressure loss relative to pressures at the open end 511 and the open end 512. As a result, a difference occurs in the power generation performance among the cells 50.

Figure 3:
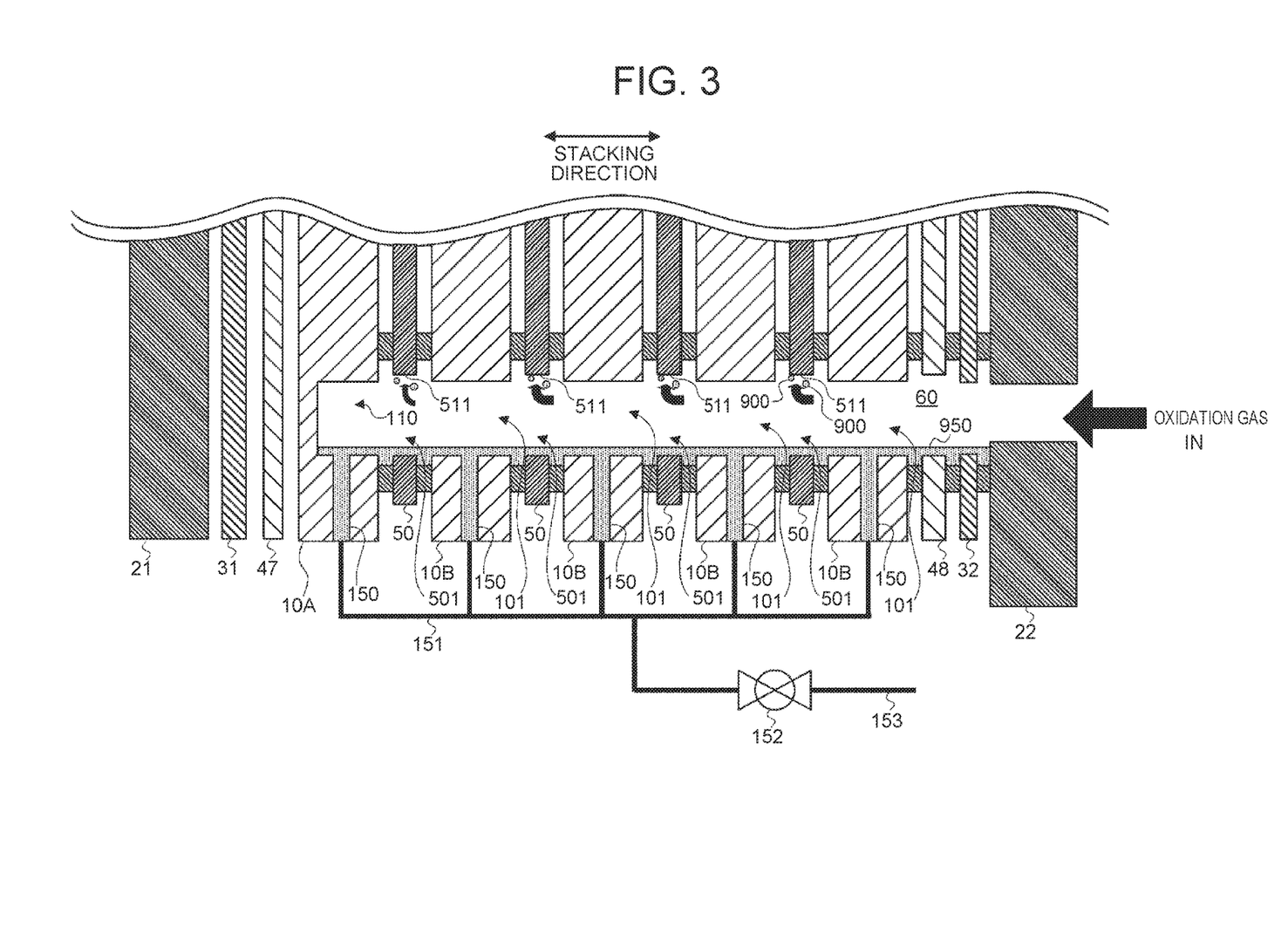
FIG. 3 is a schematic view showing an inspection apparatus according to Embodiment 1 with cells to be inspected each disposed between intermediate plates.

Characteristic parts of the inspection apparatus 1 according to this embodiment will be described below. The description of the same components as those described with the inspection apparatus as the related art shown in FIG. 2 will be omitted from the following description. FIG. 3 is a schematic view showing the inspection apparatus 1 according to this embodiment with the cells 50 to be inspected each disposed between the intermediate plates 10. In FIG. 3, a cross-section of the stack in the stacking direction is shown. As measures against the above-described possibilities in the oxidation gas supply manifold 60 will be described here, FIG. 3 is focused on parts related to the oxidation gas supply manifold 60, with the oxidation gas discharge manifold 70, the fuel gas supply manifold 80, and the fuel gas discharge manifold 90, etc. omitted. Four cells 50 are shown as objects to be inspected in FIG. 3, too, but the number of the cells 50 is of course not limited to four.

As shown in FIG. 3, in this embodiment, too, the inspection apparatus 1 has the oxidation gas supply manifold 60 which is formed as the through-holes communicate with one another when the cells 50 are each disposed between the intermediate plates 10, and through which the oxidation gas is supplied into the cells 50. However, the oxidation gas supply manifold 60 of this embodiment has water drain holes 150 that extend downward and are respectively formed on the outer side of the cells 50 located at both ends in the stacking direction. In the example of the configuration shown in FIG. 3, the water drain holes 150 are provided not only on the outer side of the cells 50 located at both ends in the stacking direction but also on the inner side of the cells 50 located at both ends in the stacking direction. Specifically, to describe this according to FIG. 3, other than the two outermost water drain holes 150, three water drain holes 150 are provided on the inner side of these two water drain holes 150. More specifically, in the example of the configuration shown in FIG. 3, the intermediate plates 10 are thick enough to form the water drain hole therein, and the water drain holes 150 are respectively formed inside the plurality of intermediate plates 10. In other words, the water drain holes 150 are respectively formed inside both intermediate plates 10 adjacent to the cell 50 to be inspected. More specifically, the water drain hole 150 is formed inside the intermediate plate 10 so that the hole extends downward from the oxidation gas supply manifold 60. The water drain holes 150 communicate with one another on a lower side of the water drain holes 150. Specifically, the water drain holes 150 are connected to a pipe 151 and coupled to each other through the pipe 151. A water discharge pipe 153 is connected to the pipe 151 through a valve 152, such as an air-operated valve. Thus, water inside the oxidation gas supply manifold 60 can be discharged from the water discharge pipe 153 through the water drain holes 150, the pipe 151, and the valve 152. Closing the valve 152 can collect water in the water drain holes 150 and the pipe 151. Opening the valve 152 can discharge water.

Due to the presence of the water drain holes 150, water present at a lower part inside the oxidation gas supply manifold 60 is drawn into the water drain holes 150. As the water drain holes 150 are provided on the open side and the closed side of the oxidation gas supply manifold 60 and the water drain holes 150 are coupled to each other, the water present at the lower part inside the oxidation gas supply manifold 60 is guided into the water drain holes 150 without unevenness in the stacking direction. It is therefore possible to form a uniform water film 950 across all the cells 50 to be inspected, on the lower side in the inner periphery of the oxidation gas supply manifold 60. Water dripping from the open ends 511 is incorporated into the water film 950 (i.e., the dripping water is absorbed into the water film 950 by water attracting and conducting actions), so that, during inspection, the amount of water collecting inside the oxidation gas supply manifold 60 can be made uniform regardless of the position. It is therefore possible to reduce the influence on the power generation performance of the water collecting unevenly according to the position. In other words, it is possible to reduce the difference in the power generation performance among the cells 50 based on the position of the cell 50 in the inspection apparatus 1.

In this embodiment, the water drain holes 150 are respectively formed inside the plurality of intermediate plates 10 as described above. Thus, the variation in the water level is further reduced. It is therefore possible to further reduce the difference in the power generation performance among the cells 50 based on the position of the cell 50 in the inspection apparatus 1.

As shown in FIG. 3, in this embodiment, a lateral hole 110 that extends the manifold in the stacking direction is formed in the intermediate plate 10A that is the intermediate plate located at the end on the closed side of the oxidation gas supply manifold 60. Accordingly, the position of a lower end of the lateral hole 110 in an up-down direction is substantially the same as the positions of lower surfaces of the through-holes 101 in the up-down direction. Thus, a water film can be formed in the lateral hole 110 as in the through-holes 101. If the lateral hole 110 is thus provided, the configurations on both sides of the cell 50 located farthest on the deep side of the oxidation gas supply manifold 60 (the cell 50 on the right side of and adjacent to the intermediate plate 10A in FIG. 3) can be made symmetrical, which can reduce the difference in the shape of the manifold among the cells 50 in view of forming a water film. In other words, the difference between the shape of the manifold around the cell 50 located farthest on the deep side of the oxidation gas supply manifold 60 and the shape of the manifold around the other cells 50 can be reduced. It is therefore possible to further reduce the variation in the water level, and to further reduce the difference in the power generation performance among the cells 50 based on the position of the cell 50 in the inspection apparatus 1. While it is preferable that the lateral hole 110 be thus provided in the intermediate plate 10A and that the water drain hole 150 be also provided in the intermediate plate 10A, it is not absolutely necessary to provide the lateral hole 110 and the water drain hole 150 in the intermediate plate 10A. Alternatively, the through-hole 101 and the water drain hole 150 may also be provided in the intermediate plate 10A, and the end on the closed side of the oxidation gas supply manifold 60 may be formed by the first terminal 47.

Figure 4:
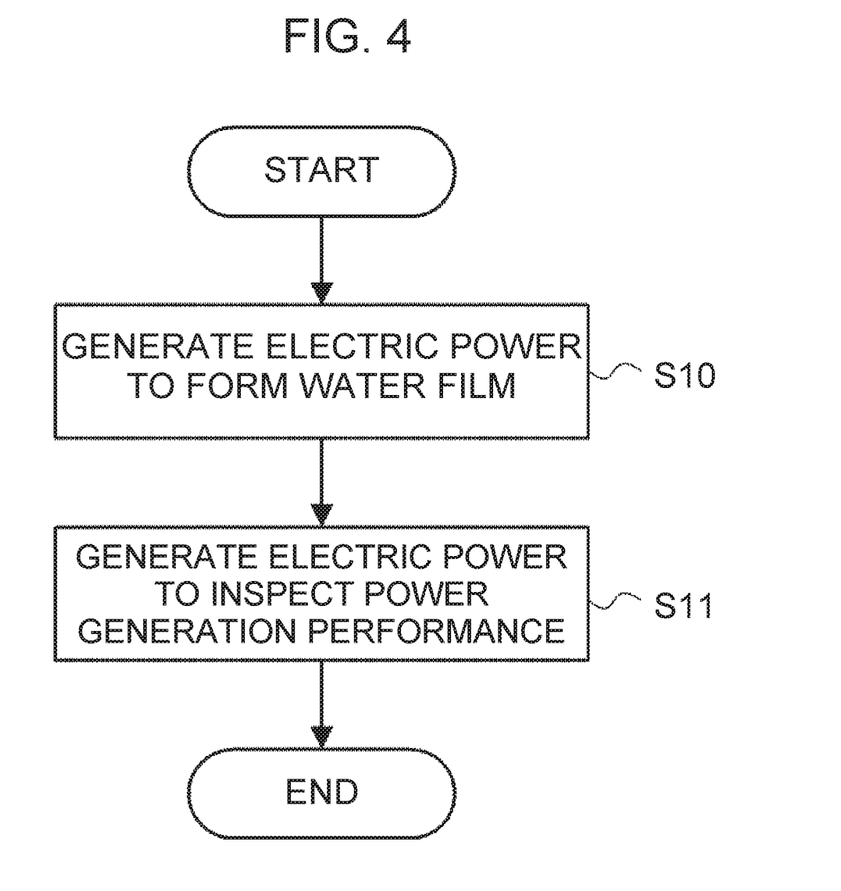
FIG. 4 is a flowchart showing an example of the procedure of a method of inspecting the power generation performance of cells using the inspection apparatus according to the embodiment.

For example, the water film 950 can be formed as water resulting from power generation during a preparation stage before inspection collects in the oxidation gas supply manifold 60. Therefore, the inspection can be performed, for example, by the procedure as shown in FIG. 4. FIG. 4 is a flowchart showing an example of the procedure of a method of inspecting the power generation performance of the cells 50 using the inspection apparatus 1.

First, in step 10 (S10), power generation is performed to form the water film 950. Specifically an oxidation gas and a fuel gas are supplied to the cells 50 to make the cells 50 generate electric power. Next, in step 20 (S20), power generation is performed to inspect the power generation performance of the cells 50, after the water film 950 has been formed across all the cells 50 to be inspected, on the lower side in the inner periphery of the oxidation gas supply manifold 60.

In this way, the power generation performance of the cells 50 can be evaluated in a state where the difference in the power generation performance among the cells 50 based on the position of the cell 50 in the inspection apparatus 1 is reduced. In step 10 and step 20, the valve 152 needs to be kept closed. This is to maintain the water film 950, and to prevent the oxidation gas supplied to the oxidation gas supply manifold 60 from leaking out. However, if the water level of the water film 950 becomes too high, the valve 152 may be opened to lower the water level. For example, a water level gauge may be provided inside the oxidation gas supply manifold 60, and the valve 152 may be operated to open and close so that the water level remains within a predetermined range.

Figure 5:
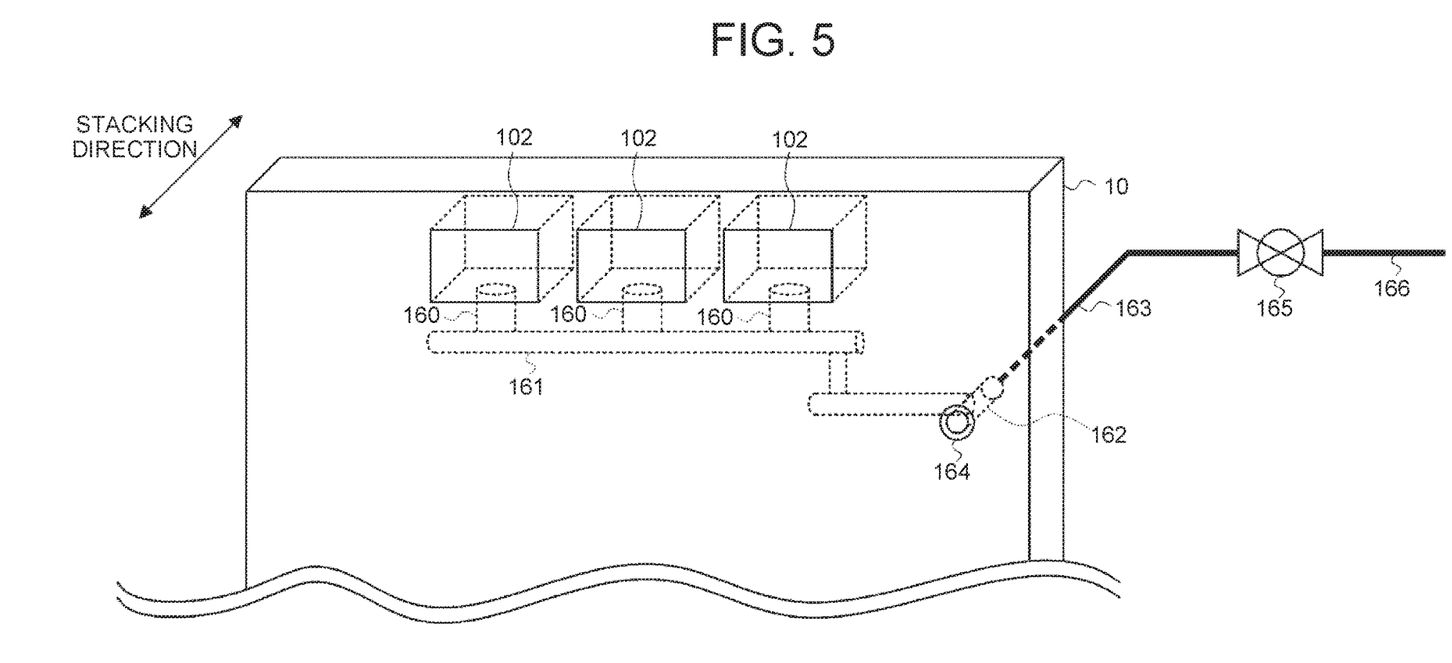
FIG. 5 is a perspective view of the intermediate plate according to Embodiment 1.

Next, measures against the above-described possibilities in the oxidation gas discharge manifold 70 will be described. FIG. 5 is a perspective view of the intermediate plate 10 according to this embodiment. As the measures against the above-described possibilities in the oxidation gas discharge manifold 70 will be described here, FIG. 5 is focused on parts related to the oxidation gas discharge manifold 70, with the other parts omitted.

In this embodiment, too, the inspection apparatus 1 has the oxidation gas discharge manifold 70 which is formed as the through-holes communicate with one another when the cells 50 are each disposed between the intermediate plates 10, and through which the oxidation gas is discharged from inside the cells 50. As in the inspection apparatus according to the related art of FIG. 2, the oxidation gas discharge manifold 70 is formed as the through-holes 502 and the through-holes 102 communicate with one another. As shown in FIG. 5, the oxidation gas discharge manifold 70 according to this embodiment has water drain holes 160 that are formed in the through-holes 102 and extend downward. In the example shown in FIG. 5, each intermediate plate 10 has three through-holes 102, and the through-holes 102 communicate respectively with the through-holes 502 provided in the cell 50. The water drain holes 160 are respectively provided for the three through-holes 102.

The water drain holes 160 are each connected to an intermediate plate internal pipe 161. The intermediate plate internal pipe 161 is connected to a water discharge through-hole 162. The water discharge through-hole 162 is a hole extending through the intermediate plate 10 in the stacking direction, and forms a pass-through manifold 163 by communicating with the water discharge through-holes 162 provided in other intermediate plates 10 and the through-holes provided in the cells 50. More specifically, the pass-through manifold 163 is formed as the water discharge through-holes 162 and the through-holes of the cells 50 communicate with one another through gaskets 164. The pass-through manifold 163 extends in the stacking direction, and couples together the intermediate plate internal pipes 161 of the intermediate plates 10 that are continuous in the stacking direction. In the case where the intermediate plate 10 has a coolant flow passage (not shown) through which a coolant flows, and a coolant is passed through this coolant flow passage during inspection to thereby omit passing the coolant through the cell 50, the pass-through manifold 163 may be provided at a position in the intermediate plate 10 corresponding to the position of a coolant manifold (not shown) provided in the cell 50. In other words, the pass-through manifold 163 may be formed using the coolant manifold provided in the cell 50.

A water discharge pipe 166 is connected to the pass-through manifold 163 through a valve 165, such as an air-operated valve. Thus, water inside the oxidation gas discharge manifold 70 can be discharged from the water discharge pipe 166 through the water drain holes 160, the intermediate plate internal pipe 161, the pass-through manifold 163, and the valve 165. Closing the valve 165 can prevent the fuel gas having passed through a membrane inside the cell 50 from diffusing to the outside. A gas-liquid separator may be provided at an intermediate point of the water discharge pipe 166 to separate gas and water from each other.

As has been described above, in this embodiment, the water drain holes 160 extending downward are formed in the oxidation gas discharge manifold 70. Therefore, water spurting out of the open ends 512 of the cells 50 is discharged through the water drain holes 160. Thus, water once discharged into the oxidation gas discharge manifold 70 can be prevented from returning into the cells 50. Accordingly, the variation among the cells 50 in the amount of water retained in the flow passage inside the cell 50 can be reduced. It is therefore possible to reduce the difference in the power generation performance among the cells 50 based on the amount of water returning into the cell 50.

While it is preferable that all the intermediate plates 10 including the intermediate plate 10A be configured as shown in FIG. 5, only the intermediate plates 10B of the intermediate plates 10 may be configured as shown in FIG. 5. In the case where the intermediate plate 10A is configured as shown in FIG. 5, a lateral hole similar to the lateral hole 110 may be provided for the oxidation gas discharge manifold 70 in the intermediate plate 10A to realize the configuration shown in FIG. 5, or the through-hole 102 may be provided in the intermediate plate 10A as in the intermediate plate 10B to realize the configuration shown in FIG. 5.

Embodiment 2

Next, Embodiment 2 will be described. The description of the same parts as in Embodiment 1 will be omitted. This embodiment shows another example of the configuration to address the possibilities in the oxidation gas supply manifold 60. In Embodiment 1, FIG. 3 has been shown as an example of the configuration to address the possibilities in the oxidation gas supply manifold 60. As an example of the configuration to address those possibilities, the inspection apparatus 1 can have water drain holes that are coupled to each other, respectively at both ends of the cell group to be inspected. Accordingly, as shown in FIG. 6, at least one of the water drain holes 150 may be formed inside the second end plate 22 that is the end plate disposed on the outer side, in the stacking direction, of the group of the intermediate plates 10B disposed in an array.

Figure 6:
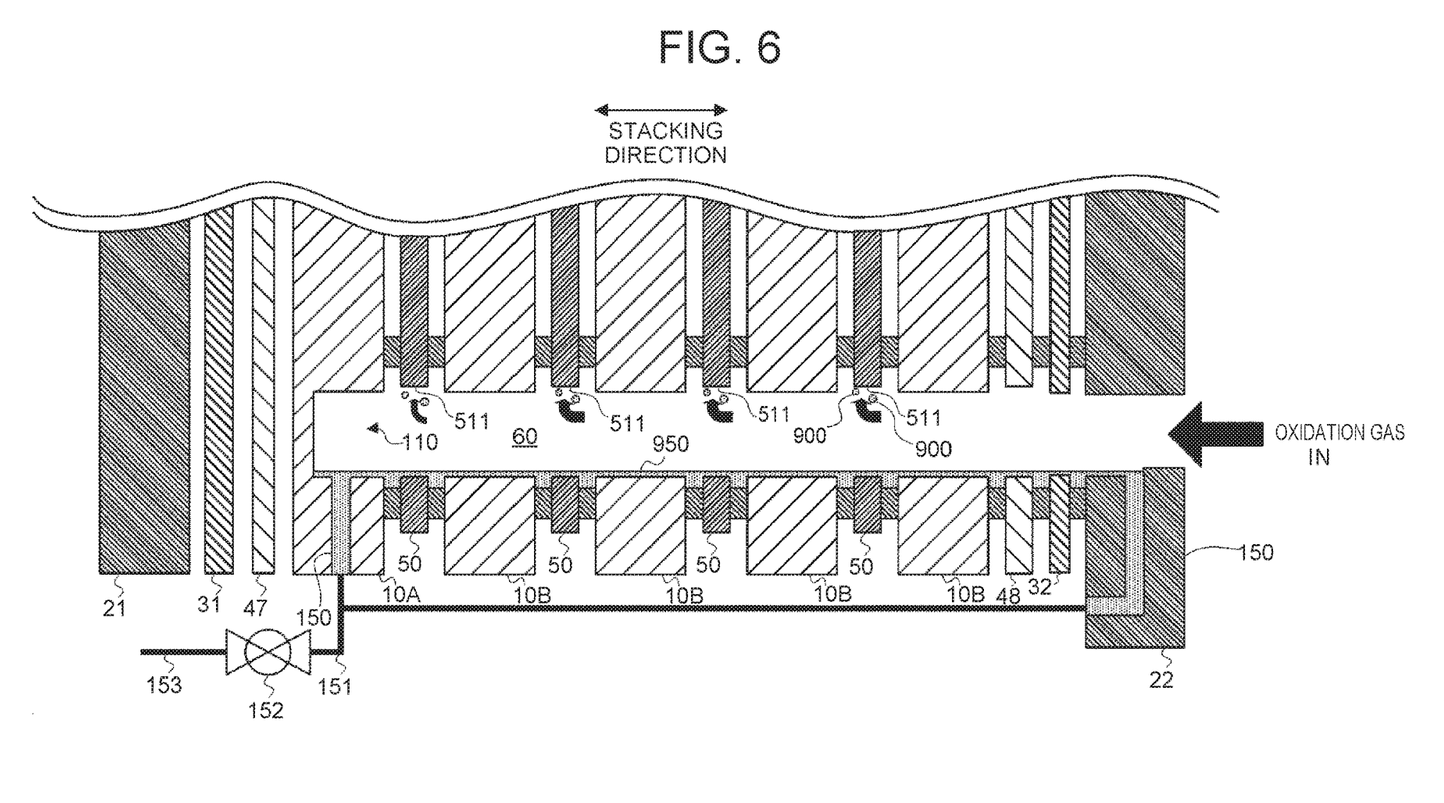
FIG. 6 is a schematic view showing an inspection apparatus according to Embodiment 2 with cells to be inspected each disposed between intermediate plates.

FIG. 6 is a schematic view showing the inspection apparatus 1 according to Embodiment 2 with the cells 50 to be inspected each disposed between the intermediate plates 10. In FIG. 6, a cross-section of the stack in the stacking direction is shown. As measures against the above-described possibilities in the oxidation gas supply manifold 60 will be described here, FIG. 6 is focused on parts related to the oxidation gas supply manifold 60, with the oxidation gas discharge manifold 70, the fuel gas supply manifold 80, the fuel gas discharge manifold 90, etc. omitted. Four cells 50 are shown as objects to be inspected in FIG. 6, too, but the number of the cells 50 is of course not limited to four.

As shown in FIG. 6, in this embodiment, the water drain holes 150 extending downward are respectively formed inside the intermediate plate 10A forming the end on the closed side of the oxidation gas discharge manifold 70 and inside the second end plate 22, while the intermediate plates 103 are not provided with the water drain holes 150. In this embodiment, too, the water drain holes 150 are coupled to each other on the lower side of the water drain holes 150. Specifically, the water drain holes 150 are each connected to the pipe 151 and coupled to each other through the pipe 151. The water discharge pipe 153 is connected to the pipe 151 through the valve 152.

Thus, in this embodiment, too, the water drain holes 150 are provided on the open side and the closed side of the oxidation gas supply manifold 60 and the water drain holes 150 are coupled to each other, so that the uniform water film 950 across all the cells 50 to be inspected can be formed. It is therefore possible to reduce the difference in the power generation performance among the cells 50 based on the position of the cell 50 in the inspection apparatus 1.

In this embodiment, one of the water drain holes 150 is provided in the end plate that is a member easier to process than the intermediate plate 10. Thus, the water drain holes 150 can be provided more easily than if all the water drain holes 150 are provided in the intermediate plates 10. In other words, the difference in the power generation performance among the cells 50 can be reduced more easily.

In this embodiment, too, the lateral hole 110 is provided in the intermediate plate 10A. Accordingly, as in Embodiment 1, the difference in the shape of the manifold among the cells 50 in view of forming a water film can be reduced. It is therefore possible to further reduce the variation in the water level, and to further reduce the difference in the power generation performance among the cells 50 based on the position of the cell 50 in the inspection apparatus 1. While it is preferable that the lateral hole 110 be thus provided in the intermediate plate 10A and that the water drain hole 150 be also provided in the intermediate plate 10A, it is not absolutely necessary to provide the lateral hole 110 and the water drain hole 150 in the intermediate plate 10A. In this case, the water drain hole 150 can be provided in one intermediate plate 10B that is adjacent to the intermediate plate 10A located farthest on the deep side. Alternatively, the through-hole 101 and the water drain hole 150 may also be provided in the intermediate plate 10A, and the end on the closed side of the oxidation gas supply manifold 60 may be formed by the first terminal 47. Moreover, the through-hole 101 may be provided in the intermediate plate 10A, and through-holes may also be provided in the first terminal 47 and the first electric insulating plate 31, and thus the end on the closed side of the oxidation gas supply manifold 60 may be formed by the first end plate 21 and the water drain hole 150 may be provided in the first end plate 21. In short, the water drain holes 150 may be provided only in the first end plate 21 and the second end plate 22.

Embodiment 3

Next, Embodiment 3 will be described. The description of the same parts as in Embodiment 1 will be omitted. This embodiment shows another example of the configuration to address the possibilities in the oxidation gas discharge manifold 70. In Embodiment 1, FIG. 5 has been shown as an example of the configuration to address the possibilities in the oxidation gas discharge manifold 70. As an example of the configuration to address those possibilities, for example, the intermediate plate 10 may be configured as shown in FIG. 7.

In this embodiment, one through-hole 102 that is large enough to contain all the plurality of through-holes 502 (e.g., three through-holes 502) provided in one cell 50 is provided in one intermediate plate 10. Accordingly, the oxidation gas discharge manifolds 70 corresponding respectively to the through-holes 502 of the cell 50 communicate with one another in the through-hole 102 of the intermediate plate 10. To secure the rigidity of the cell 50, the plurality of through-holes 502 arrayed at predetermined intervals are provided instead of one large through-hole 502. The plurality of through-holes 502 are provided in an array in the horizontal direction perpendicular to the stacking direction.

Figure 7:
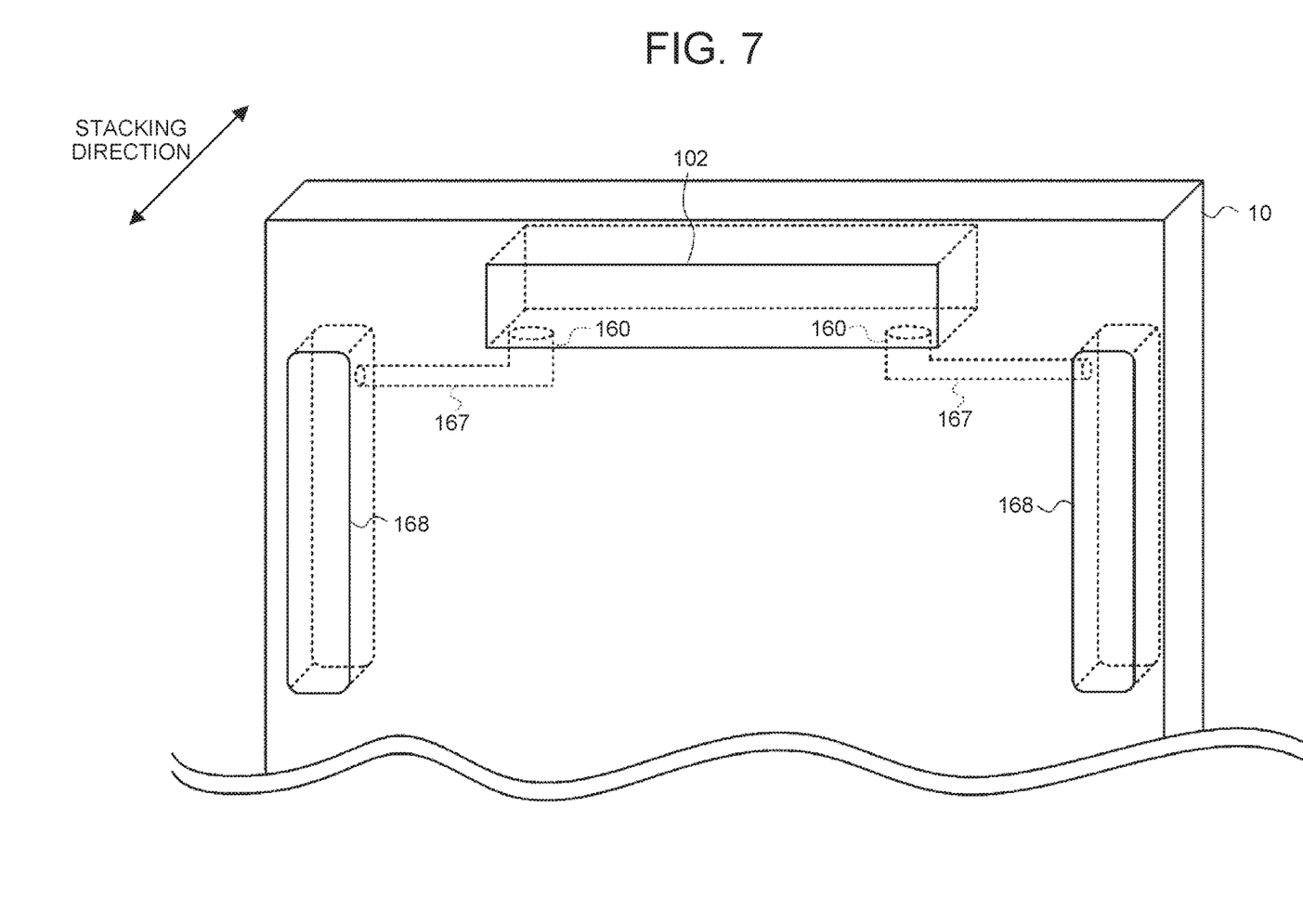
FIG. 7 is a perspective view of the intermediate plate according to Embodiment 2.

In this embodiment, too, as shown in FIG. 7, the oxidation gas discharge manifold 70 has the water drain holes 160 that are formed in the through-hole 102 of the intermediate plate 10 and extend downward. More specifically, the water drain holes 160 are provided one at each end of the through-hole 102 in the horizontal direction perpendicular to the stacking direction. The water drain holes 160 are respectively connected to intermediate plate internal pipes 167. The intermediate plate 10 further has tanks 168 in which water flowing out of the water drain holes 160 of the through-hole 102 is collected. For example, as shown in FIG. 7, the tanks 168 are provided one at each end of the intermediate plate 10 in the horizontal direction perpendicular to the stacking direction. The intermediate plate internal pipes 167 are respectively connected to the tanks 168. Accordingly, water flowing out of the water drain holes 160 is discharged into the tanks 168. Thus, it is possible to continuously discharge water by a simple configuration, without forming the pass-through manifold as in Embodiment 1. For example, in the case where the amount of water discharged from the cells 50 is small, such as when an inspection at a low load current is performed, the inspection can be performed with the water discharged into the tanks 168.

As has been described above, in this embodiment, the oxidation gas discharge manifolds 70 corresponding respectively to the through-holes 502 of the cell 50 communicate with one another in the through-hole 102 of the intermediate plate 10. Accordingly, masses of water respectively generated from the open ends 512 of the plurality of through-holes 502 are coupled together and discharged as one puddle through the water drain holes 160. Thus, it is possible to evenly discharge the water drops generated from each of the open ends 512 of the plurality of through-holes 502. In other words, it is possible to level out the discharge of water from the open ends 512 of the cells 50.

While it is preferable that all the intermediate plates 10 including the intermediate plate 10A be configured as shown in FIG. 7, only the intermediate plates 10B of the intermediate plates 10 may be configured as shown in FIG. 7. In the case where the intermediate plate 10A is configured as shown in FIG. 7, a lateral hole similar to the lateral hole 110 may be provided for the oxidation gas discharge manifold 70 in the intermediate plate 10A to realize the configuration shown in FIG. 7, or the through-hole 102 may be provided in the intermediate plate 10A as in the intermediate plate 10B to realize the configuration shown in FIG. 7.

In this embodiment, the intermediate plate 10 is provided with both of the one large through-hole 102 and the tanks 168; however, only one of the one large through-hole 102 and the tanks 168 may be applied to the configuration shown in Embodiment 1.

The present disclosure is not limited to the above embodiments, but can be modified as appropriate within the scope of the gist of the disclosure. For example, in the above embodiments, the inspection apparatus 1 has been described that includes both of the configuration to address the possibilities in the oxidation gas supply manifold 60 and the configuration to address the possibilities in the oxidation gas discharge manifold 70; however, the inspection apparatus may include only one of these configurations.

What is claimed is:
1. An inspection apparatus comprising:
a first end plate;
a second end plate;
a plurality of electrically conductive intermediate plates disposed between the first end plate and the second end plate in a stacking direction, wherein each unit cell of a plurality of unit cells of a fuel cell is disposed between a pair of the intermediate plates; and a supply manifold which is formed as first through-holes provided in the plurality of unit cells and second through-holes provided in the plurality of intermediate plates, wherein the first through-holes are in communication with the second through-holes, and wherein an oxidation gas is supplied through the supply manifold into the unit cells, wherein:

in the stacking direction of the intermediate plates and the unit cells, one end of the supply manifold is open while another end of the supply manifold is closed, and the oxidation gas is supplied from the one end that is open, the supply manifold comprises water drain holes that extend vertically downward and are respectively formed at a first end and a second end of the intermediate plates in the stacking direction, the water drain holes are coupled to each other below the water drain holes, and an intermediate plate of the plurality of electrically conductive intermediate plates is located at the another end of the supply manifold that is closed, and comprises a lateral hole and one of the water drain holes.

2. The inspection apparatus according to claim 1, wherein:

the supply manifold further comprises additional water drain holes formed between the water drain holes respectively formed at the first end and the second end of the intermediate plates in the stacking direction, and the additional water drain holes are respectively formed inside the plurality of intermediate plates.

3. The inspection apparatus according to claim 1, further comprising a discharge manifold which is formed as third through-holes provided in the unit cells and fourth through-holes provided in the intermediate plates, wherein the third through-holes are in communication with the fourth through-holes, and wherein the oxidation gas is discharged through the discharge manifold from inside the unit cells, wherein:

an open end of an oxidation gas flow passage provided in the unit cell that opens toward the discharge manifold is located on a lower side in an inner periphery of one of the third through-holes, and the discharge manifold has a water drain hole that is formed in one of the fourth through-holes and extends downward.

4. The inspection apparatus according to claim 3, wherein:

the third through-holes are provided in one unit cell, and one of the fourth through-holes extending a length all the third through-holes is provided in one intermediate plate.

5. The inspection apparatus according to claim 3, wherein at least one of the intermediate plates includes a tank in which water flowing out of the water drain hole formed in the fourth through-hole is collected.

* * * * *